US008165108B1

(12) United States Patent
Mouilleron et al.

(10) Patent No.: US 8,165,108 B1
(45) Date of Patent: Apr. 24, 2012

(54) GRAPHICAL COMMUNICATIONS DEVICE USING TRANSLATOR

(75) Inventors: Vincent Mouilleron, Ottawa (CA);
Kashipati G. Rao, Plano, TX (US);
Atiya Suhail, Richardson, TX (US)

(73) Assignee: Alcatel-Lucent, Paris (FR)

( * ) Notice: Subject to any disclaimer, the term of this patent is extended or adjusted under 35 U.S.C. 154(b) by 1822 days.

(21) Appl. No.: 10/284,858

(22) Filed: Oct. 31, 2002

(51) Int. Cl.
*H04M 11/00* (2006.01)
(52) U.S. Cl. ...................................... 370/352; 379/90.01
(58) Field of Classification Search .......... 370/352–356, 370/410, 420; 379/90.01, 93.17
See application file for complete search history.

(56) References Cited

U.S. PATENT DOCUMENTS

| | | | | |
|---|---|---|---|---|
| 6,775,362 | B1 * | 8/2004 | Ransom .................... | 370/352 |
| 7,123,609 | B2 * | 10/2006 | Glasser et al. ............ | 370/354 |
| 2004/0117366 | A1 * | 6/2004 | Ferrari et al. ............ | 707/5 |

OTHER PUBLICATIONS

Handley, et al.; SIP: Session Inititation Protocol; IETF Network Working Group; IETF RFC 2543; Mar. 1999; pp. 1-132.

* cited by examiner

*Primary Examiner* — Suhan Ni

(57) ABSTRACT

A communication system includes a plurality of network devices that communicate using one or more protocols, such as SIP. Graphical terminals (30) communicate with the network devices. Graphical servers (32) provide a graphical user interface for the graphics terminals (30) responsive to signaling messages received by the graphical terminals (30) and forwarded to the graphical server (32) in a service request. As the user operates the interface to perform functions, graphical information on the user's actions is sent to the associated graphical server (32). The graphical server (32) interprets the graphical information and updates the graphical interface and/or generates service requests for signaling messages to create, modify and terminate communication sessions as desired by the user, using the appropriate protocol.

12 Claims, 4 Drawing Sheets

GRAPHICAL COMMUNICATIONS DEVICE USING TRANSLATOR

CROSS-REFERENCE TO RELATED APPLICATIONS

This application is related to U.S. Ser. No. 10/092,075, entitled "Graphical Telephone System", filed Mar. 6, 2002 to Ransom, which is incorporated by reference herein.

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to a digital communications system.

2. Description of the Related Art

Over the last two decades, communications capabilities have increased dramatically. Current communication networks are now capable of providing sophisticated features such as multiple party conferencing with multiple private sidebar conversations, programmable "follow-me" calling, and sophisticated voice mail options.

Unfortunately, the main interface to a communication network, the 12-key telephone pad, has not appreciably changed for many decades. As a result, many available features are seldom used, because accessing the features by key sequences is non-intuitive and error-prone. In some cases, features can be provisioned by a user through a computer interface apart from the telephone. For example, follow-me calling allows a user to have a single telephone number which is used to access a number of communication devices associated with the user, such as a home telephone number, a work telephone number, a mobile telephone and voice mail, in a specified sequence. The user can define the sequence in which the communication devices are accessed in relation to certain criteria, such as date and time. In a typical scenario, a user may define a work day sequence where his or her work number is accessed first, a secretarial phone accessed second, a mobile phone accessed third and voice mail accessed fourth; the weekend sequence may be home phone first, mobile phone second and voice mail third. The desired sequence is stored in a database of a network provider. To ease the burden of user programming, some providers have allowed the database to be modified by users through a Web page over an Internet connection. However, use of a separate computer connection is often inconvenient, and Internet provisioning of services can reasonably be used only for certain types of features that do not change often.

Recently, SIP (Session Initiation Protocol) was developed to assist in providing advanced telephony services using VOIP (Voice over Internet Protocol) over a digital communication network (which could include the Internet or other global data network). Using a telephone with a graphical interface, a user can easily create, modify and terminate multiple telecommunications sessions with one or more participants by manipulating objects on the telephone screen.

Each SIP phone manufacturer is free to design its own GUI. This is both a strength and a weakness of a SIP Phone. On the one hand, a user can choose a phone that has desirable interface characteristics. On the other hand, the user's ability to have multiple SIP phones from multiple manufacturers is impeded by the requirement of learning different interfaces for each phone. A user is likely to become accustomed to a single interface and will face difficulties using telephones with different interfaces. Since a single home or office may use telephones from multiple manufacturers, the advantages of using a SIP phone for simplified access to advanced features are greatly diminished.

Therefore, a need has arisen for a method and apparatus for providing a consistent user interface to telephones from multiple manufacturers.

BRIEF SUMMARY OF THE INVENTION

In the present invention, a communications system is provided for communication over a digital network. One or more communication servers are coupled to the network for enabling communications sessions responsive to commands conforming to one or more known protocols. A plurality of graphical terminals are coupled to the network for communicating by sending and receiving packetized data and signaling messages over the network during a communications session. One or more graphical servers, each coupled to a plurality of the graphical terminals, receive service requests from the graphical terminals, where at least some of the service requests indicate a signaling message received by an associated graphical terminal. The graphical servers provide graphical information to the graphical terminals responsive to the service requests to provide a graphical interface, receive control information associated with actions by users using the graphical interface, and generate service requests to create signaling messages responsive to the control information

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-6 of the drawings, like numerals being used for like elements of the various drawings.

Figure 1:
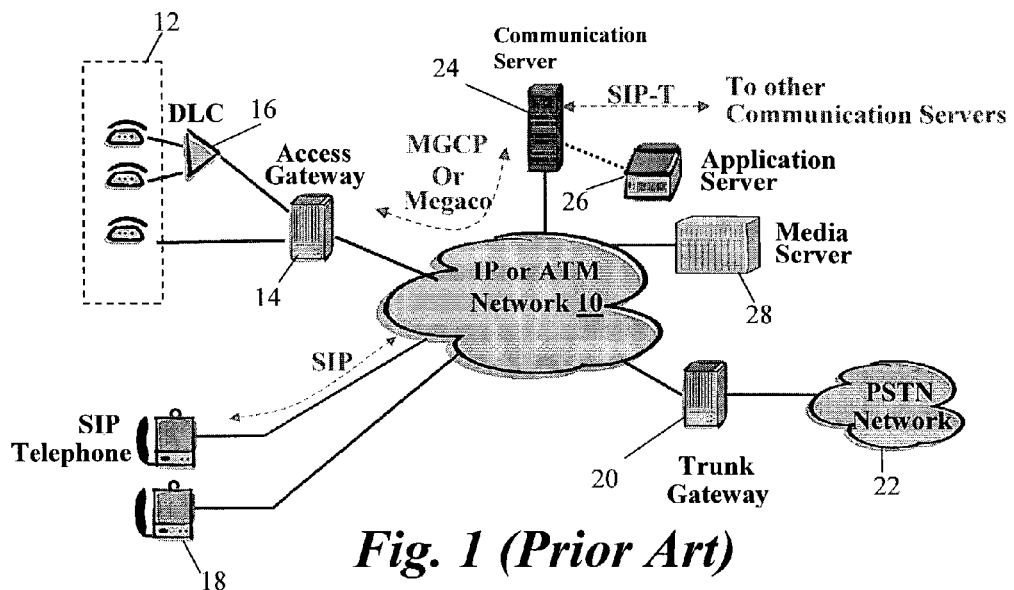
FIG. 1 illustrates a block diagram of a presently envisioned communications network using VOIP.

FIG. 1 illustrates a current vision for the implementation of a packet-based Next Generation Network (NGN). A packet-based network 10 is the main carrier of telecommunications traffic. The network 10 could use, for example, IP (Internet Protocol) or ATM (Asynchronous Transfer Mode). Legacy telephone equipment 12 (i.e., present-day telephones and similar equipment compatible with the public switched telephone network) is coupled to the network 10 via access gateways 14, either directly or through digital loop carriers 16.

The access gateways 14 interface between the analog legacy telephone equipment and the network 10, using a protocol such as MGCP (Media Gateway Control Protocol) or MEGACO (H.248).

SIP telephones 18 can be connected directly to the network 10. SIP telephones are intelligent devices that contain processors that are independent from a central switching location (i.e., a central office) and have one or more processors to create, modify and terminate communication sessions.

A trunk gateway 20 provides an interface between the packet network 10 and the PSTN (public switched telephone network) 22.

Communication servers (such as a SIP Server or a H.323 gatekeeper, also referred to as "Softswitches") 24, application servers 26 and media servers 28 are instrumental in providing advanced functions. A communication server 24 is a software-based entity that provides call control functionality. A communication server may support multiple packet-based protocols, such as SIP, MGCP, MEGACO and multiple telephony and data protocols, such as CAS, INAP, ISDN, SS7, TCAP, TCP/IP. A communication server 24 may interface with the PSTN 22 through various gateways.

In a SIP environment, a communication server 24 may act as a SIP proxy server for name resolution and user location—similar to domain server. In this way, a name (similar to a domain name) can be dynamically associated with a current IP address. Also, a SIP proxy server may be used for redirection of packets, where the proxy server "pretends" to the other network elements that it is the user's SIP terminal and forwards messages to the real SIP terminal (or conceivably to another SIP Proxy).

Application servers 26 provide services that may result in termination of a call, such as voice mail, conference bridging, pre-paid calling, or delivering services and information to an end user. An application server can be coupled to other data networks, such as the Internet, to gain access to information systems.

Media servers 28 provide media processing under control of a media gateway controller (not shown). The media server 26 could provide, for example, voice storage and responses for voice mail, or video streams.

In operation, SIP telephones 18 provide services by communicating over network 10 using the SIP protocol. The SIP protocol is designed to be flexible in order to accommodate any type of voice or data communication. For example, conference calling can be supported using multicast or a mesh of unicast relations, or a combination of both. A party to a conference call, could, for example, have a sidebar private communication with one of the parties to the conference and an instant messaging (text) communication with another party. Communications may have voice and/or video components.

The SIP protocol is based around using smart terminals (SIP phones 18) and a "dumb" network. Hence, the network 10 passes data as directed by the phones, allowing flexibility in the types of communications between SIP devices. Each SIP phone has flexibility in determining the manner in which communication sessions are created, modified and terminated. For example, some manufacturers may provide SIP telephones with a large number of buttons to control common session types, while others may rely on a more graphical interface with a touch sensitive screen. In particular, the actions taken by the user to initiate a communications session could vary between phone types. For example, one SIP phone could create a sidebar conversation by dragging a graphical representation of one of the parties to a separate "room" shown on the SIP phones screen. Another SIP phone could create a sidebar conversation by clicking on a party and selecting "sidebar" from a drop-down box. The variations on how sessions are initiated (or modified and terminated) are almost endless. Hence, SIP phones may easily fail in their quest to be user-friendly.

Figure 2:
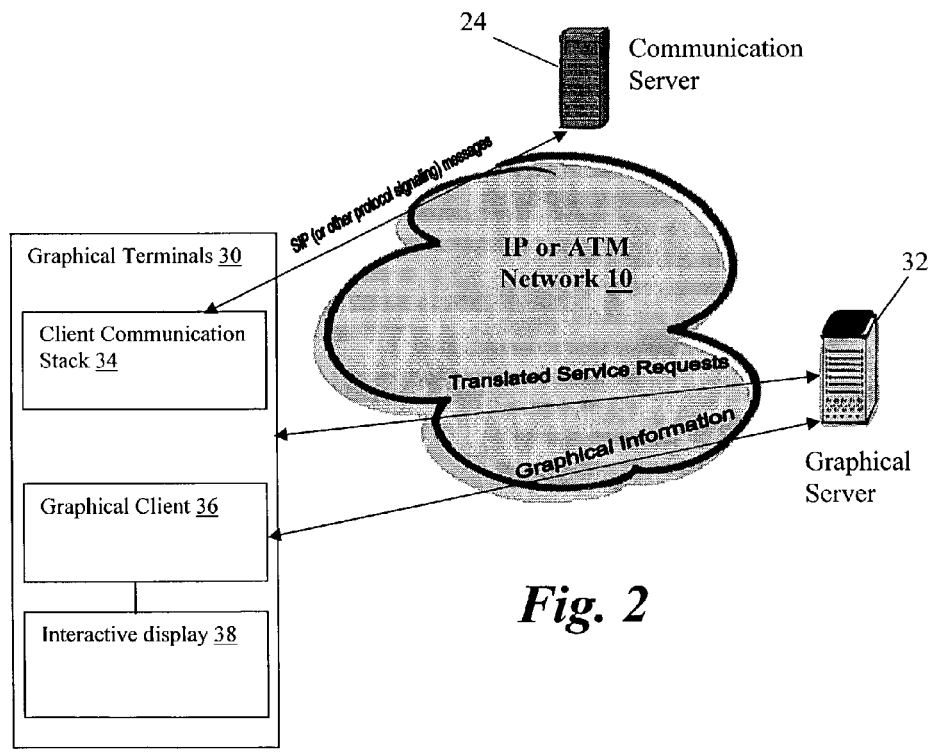
FIG. 2 illustrates a block diagram of a communications network using the present invention.

A basic block diagram of the preferred embodiment of the present invention is illustrated in FIG. 2. In the illustration, the functionality of SIP telephones 18 has been replaced by graphical terminals 30 and graphical servers 32. The communications server 24 uses a standard protocol, such as SIP, to communicate with the graphical terminals 30, as if each graphical terminal 30 was a standard SIP (or other protocol) phone 18. Hence, from the point of the communication server 24, the graphical terminal 30 is a standard device which communicates using a standard protocol.

Signaling messages are handled in a client communication stack 34 within the graphical terminal 30. The graphical terminal 30, however, does not directly operate its graphical user interface (GUI) responsive to the signaling messages. Instead, service requests are forwarded to an associated graphical server 32 in response to the signaling messages; as described in greater detail below, a translator is used in the preferred embodiment to generate the service requests from the signaling messages.

In response to receiving a signaling message from a graphical terminal 30, the graphical server 32 sends graphical information to a graphical client 36 in the graphical terminal 30. In response to the graphical information from the graphical server 32, the graphical client 36 controls the interactive display 38, which is the interface with the user. The interactive display 38 could include, for example, a touch screen, audio circuitry and keys. The capabilities of a given graphical terminal 30 could be sent to the graphical server 32 as part of a service request and could include information on the graphics capability of the graphical terminal, such as display size and color depth, memory size, processor speed, input devices and so on. Alternatively, and preferably, the capabilities could be communicated from the graphics terminal 30 to the graphical server 32 upon deployment and when material updates, such as the addition of memory, are made to the graphics terminal.

While only one graphical terminal 30 and one graphical server 32 is shown in FIG. 2, it is understood that, in a typical implementation, there would be multiple graphical terminals, where each graphical terminal 30 would be associated with a graphical server 32 with an associated network address on network 10. A provider would generally use multiple graphical servers 32, with each graphical server 32 servicing a subset of the graphical terminals 30. For the shortest latency, the graphical servers 32 should be located proximate the associated graphical terminals 30, although proximity is not strictly required.

The graphical server could communicate with the graphical client 36 using a number of available languages, such as HTML (Hypertext Markup Language), FLASH (by Macromedia, Inc.), Shockwave (by AtomShockwave Corp.), JAVA (by Sun Corporation) or other graphical language. Graphical information sent from the graphical server 32 to the graphical client 36 could include, for example, programs to control the operation of the display and graphical objects such as icons and images. The graphical client 36 may also communicate with the graphical server 32 regarding the capabilities of the graphical terminal as appropriate. As the user interacts with the screen, for example, by pressing buttons and manipulating icons or other graphic objects on the interactive display, graphical information is sent back to the graphical server 32 from the graphical client 36. The information sent from the graphical client 36 to the graphical server 32 is controlled by a program (which could have been received from graphical server 32) executed on the graphical client 36. Hence, information regarding every action taken by a user is not necessarily sent to the graphical server; only that information deemed necessary for further interaction by the graphical server 32 need be sent. For example, keystrokes may be queued until an "enter" button is pressed before the information is sent to the graphical server.

The operation between the graphical client 36 and the graphical server may be similar to the operation between present day Internet browsers and Internet servers, as is well known to those skilled in the art.

The graphical server 32 also sends information back to the client communication stack 34 in order to generate signaling messages back to the communication server 24. In the preferred embodiment, the graphical server 32 sends service requests that are translated into signaling messages of the appropriate standard protocol for communicating with the communication server 24.

As an example of the operation of communication system of FIG. 2, the communication server 24 might send an invite message to a graphical terminal 30 to invite the user into a multi-party communication. The graphical terminal 30 would send a service request to the graphical server 32 indicating that an incoming call should be displayed on the graphical terminal 30, along with other pertinent information. The graphical server 32 would respond by sending information to the terminal's graphical client 36 to display the appropriate user interface and provide an audible indicator of the incoming call (i.e., ringing a bell). Assuming the user accepts the invitation by performing an action with the user interface (for example, by pressing an "accept" button or icon), information associated with the user action would be sent to the graphical server 36, which would then generate a service request to the graphical terminal 30 indicating that an acceptance message should be sent. The graphical terminal 30 would then send an acceptance signaling message to the communication server.

There may be communication between the graphical client 36 and the graphical server 32 even in the absence of signaling messages. For example, while the service request for an acceptance was pending, the graphical server may also update the graphical client to include options available for the user during the multi-party conversation. As the user performs more actions, the graphical server may continue to send additional graphical information to the graphical client 32 and send additional service requests for signaling messages, depending upon subsequent user actions.

An advantage of controlling the user interfaces of the graphical terminals from a graphics server is the consistency of the user interface over a network, independent of the manufacturer of the phones.

Figure 3:
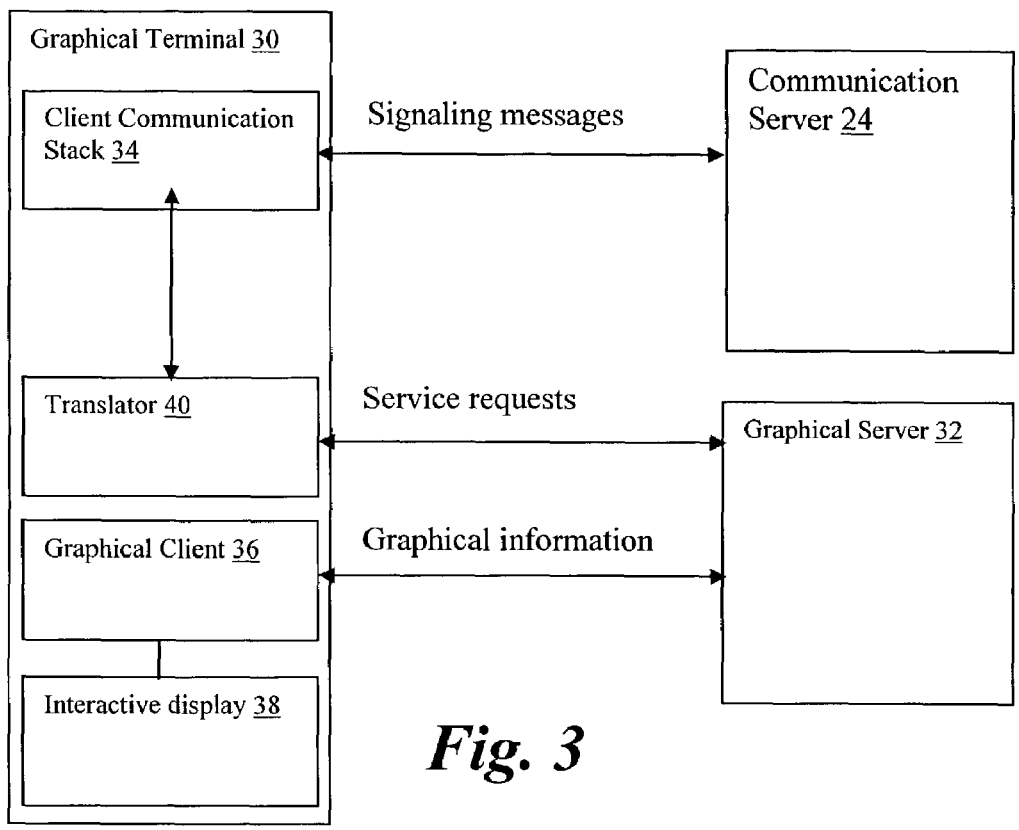
FIG. 3 illustrates a first embodiment of the communication system of FIG. 2, where a translator is found on each of the graphical terminals.

FIG. 3 illustrates a first embodiment of the communication system of FIG. 2, where a translator 40 is found on the graphical terminal 30. The translator 40 communicates between the client communication stack 34 and the graphical server 32. The translator 40 translates signaling messages from the client communication stack 34 and forwards service requests to the graphical server 32, indicating desired user interface behavior to be taking place. The translator may be able to support signaling messages in multiple protocols, such as SIP, H.323, MEGACO, and MGCP. The translation allows the graphical server 32 to communicate using a single language, which may be proprietary, independent of the protocol used between the graphics terminals 30 and the communications servers 24.

Similarly, the translator 40 receives service requests from the graphical server 32 and translates the service requests into a signaling message to be sent by the client communication stack 34 to the communications server 24.

In the preferred embodiment, the translator 40 can be updated over the network 10; for example, the graphical server, or other network device, could modify the operation of the translator as desired.

Figure 4:
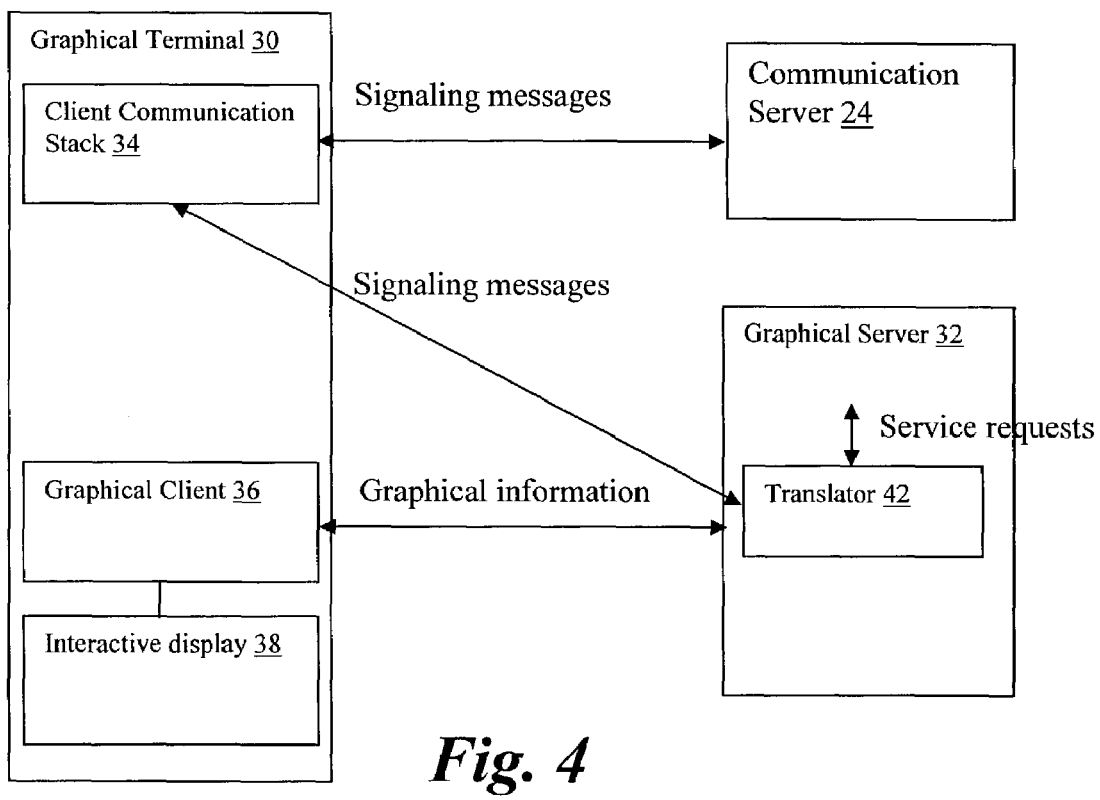
FIG. 4 illustrates a second embodiment of the communication system of FIG. 2, where a translator is found on the graphics server.

FIG. 4 shows a second embodiment of the communication system of FIG. 2, where a translator 42 is found on the graphical server 32. In this embodiment, the client communication stack 34 forwards signaling messages to the graphical server 32, which translates the messages using the translator 42. The operation of the translator is the same as that of FIG. 3, with the exception that it receives signaling messages from multiple graphical terminals 30. While the translator 42 is shown in FIG. 4 as part of the graphics server, it could be located anywhere on the network, although having the translator separate from the graphics server 32 and the client communication stack 34 would be a less efficient solution in terms of network traffic.

Further, in this embodiment, the translator 42 needs to indicate the address of the associated graphics client 36 in its service request to the graphical server 32, such that the graphical server 32 can communicate with the graphical client 36. To do so, a mapping between the signaling address scheme and graphical terminal addressing needs to be maintained and accessible at the translator level. Further, as in all embodiments, the graphical client 36 must describe its graphical capability to the graphical server 32. When a graphical terminal 30 is turned-on, it can register with an associated graphical server 32, indicating the IP address of its graphical server 36 and its display capabilities. This information can be stored in a database in the graphical server 32. At this time, the graphical terminal 30 may request a basic user log-on interface. When a user logs-on to the graphical terminal 30, the user address (for example, a SIP address) is associated with the graphical terminal 30 at the graphical server 32 in a database. When the translator receives a signaling message with the user address, it can look up the address of the graphical terminal 30 currently associated with the user.

Figure 5:
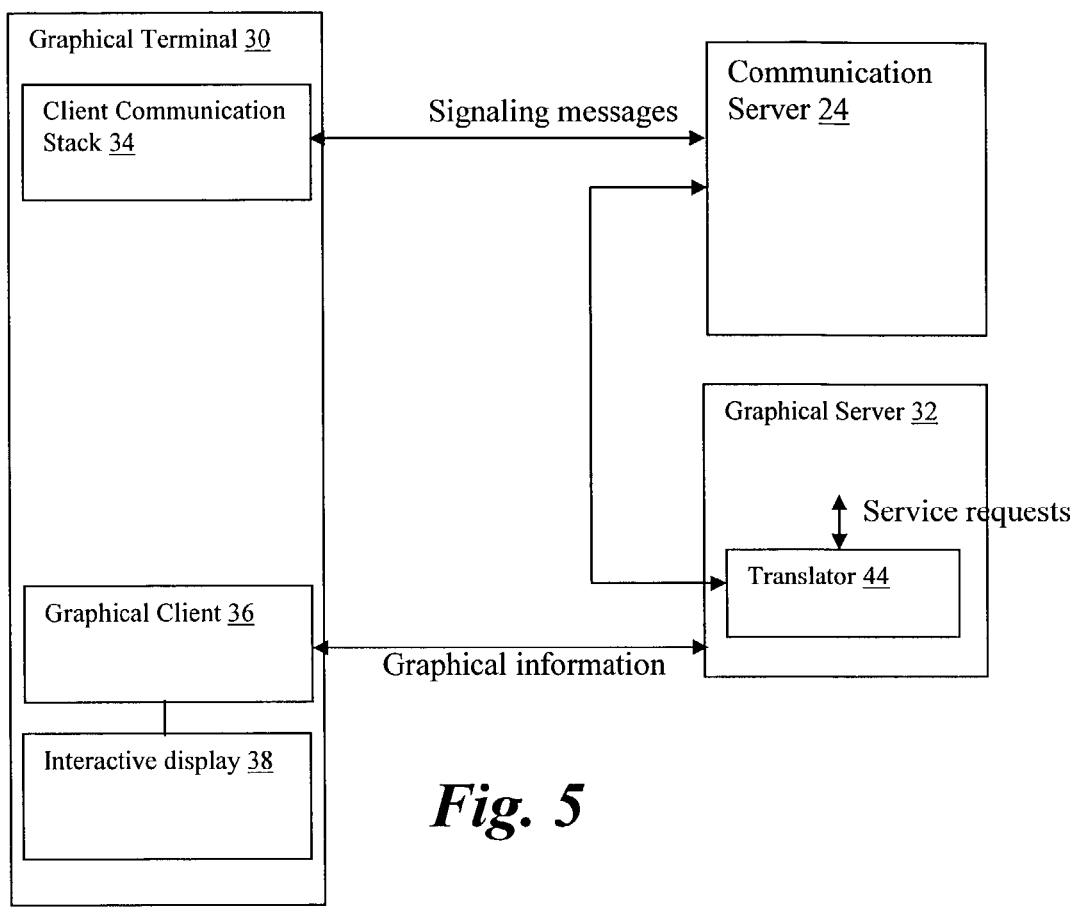
FIG. 5 illustrates a third embodiment of the communication system of FIG. 2, where a translator receives signaling messages directly from a communication server.

FIG. 5 illustrates a block diagram of a third embodiment of the communication system of FIG. 2, where a translator 44 communicates directly with the communication server 34. In the preferred embodiment, the communication server 32 sends signaling messages to both the translator 44 and the client communication stack 34. The translator 44 translates the messages to service requests for the graphical server 32. Since the signaling messages are sent by the communication server 24, rather than a graphical terminal 30, the service requests will need to indicate which graphical terminal was addressed by the translated signaling message. This is similar to the addressing problem set forth in FIG. 4; a mapping between user addresses and the graphical terminal addressing can be maintained and accessible at the translator level. At user log-on, the graphical terminal 30 can indicate the user's signaling address, which can be mapped to the physical address of its graphical client 36 (already registered in the graphical server database). The graphical server 32 then controls the interface of the graphical terminal 30 through its graphical client 36. Further, the translator 44 receives service requests from graphical server 32 and translates the requests into signaling messages to be sent to the communication server 24 on behalf of the client communication stack 34. While the translator 44 is shown in FIG. 5 as part of the graphics server, it could be located anywhere on the network.

As previously discussed, translator 44 receives signaling messages from multiple graphical terminals 30. In order to support graphical terminals 30 with various capabilities, these capabilities will need to be determined through communication between the graphical server 32 and the graphical client 36, preferably by storing information in a database during registration.

Figure 6:
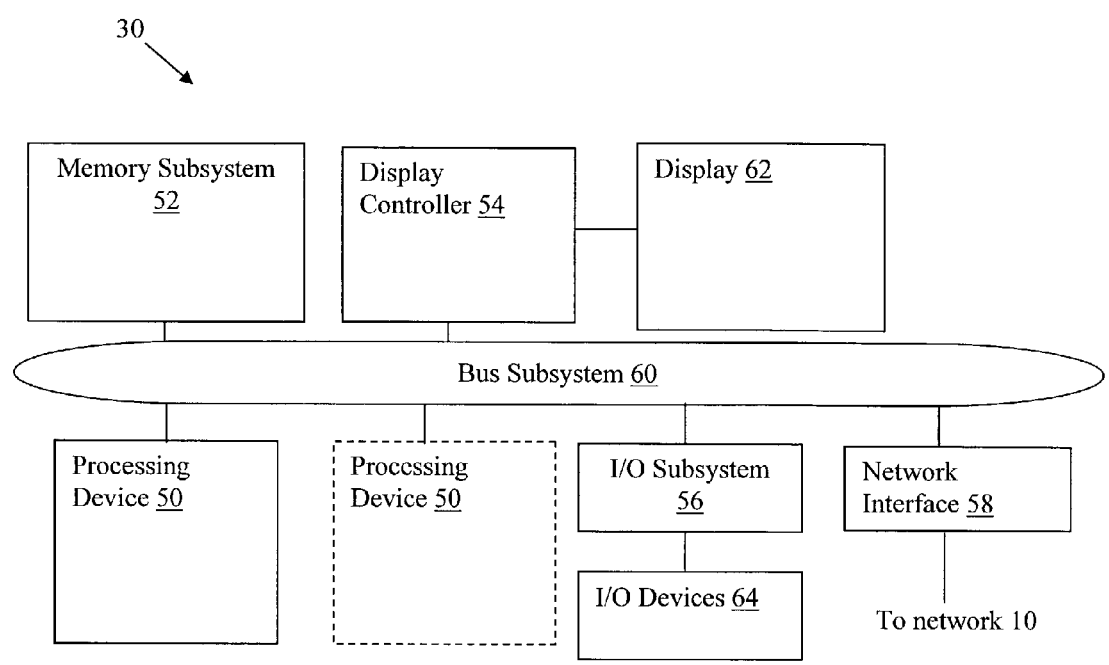
FIG. 6 illustrates a block diagram of a graphics terminal.

FIG. 6 illustrates a basic block diagram of a possible implementation for the graphics terminal 30. One or more processing devices 50 are coupled to a memory subsystem 52, display controller 54, I/O subsystem 56 and network interface 58 via a bus subsystem 60. Display controller 54 controls display 62. I/O subsystem 56 passes data between the processing devices 50 and memory subsystem 52 and I/O devices 64. Network interface 58 is coupled to network 10.

The processing devices 50 may include general-purpose processors, digital signal processors (DSPs) and coprocessors. The memory subsystem 52 can include volatile memories, such as dynamic and static rams, and non-volatile memories, such as flash memories. I/O devices 64 could include input devices such as keys, track balls, mice, and touch screens, as well as a microphone and speaker for conversing. The I/O subsystem 56 could also provide ports for content, such as USB (universal serial bus) and IEEE 1394 ports to receive data, video and graphics from a variety of sources, such as digital still and video cameras, computers, hard drives and other memory devices. The display 62 could use one of many technologies, such as cathode ray tube, touch-screen display, LCD (liquid crystal display), or OLED (organic light emitting diodes).

In operation, the graphical terminal 30 will be initially programmed with the address of its graphical server 32 or can determine the address of the graphical server 32 through auto-discovery. Also, the graphical terminal 32 will have certain base programs necessary for communication using VOIP (voice over IP) and execution of the graphical information from graphical server 32, such as network/communication software to allow access to the network 10 and programs such as the JVM (JAVA Virtual Machine), SHOCKWAVE, or FLASH.

Several options exist for downloading graphics information to the graphical terminal 30. In one embodiment, the graphical terminal 30 acts similar to an Internet web browser, with the graphical server 32 designated as the home page. In this embodiment, most of the operational code for the GUI is stored at the graphical server 32, where the graphical terminal 30 accesses the code during use. Certain objects, such as graphics and JAVA (or similar language) code may be cached in the memory subsystem 52. This embodiment works best for graphical terminals 30 that access the network over a high-speed connection, since there is a relatively large amount of graphical information passed back and forth between the graphical terminal 30 and the graphical server 32.

In a second embodiment, a larger portion of the necessary code and object is normally stored in the memory subsystem 52 of the graphical terminal 30, with control of the code and objects dependent upon graphical information from the graphical server 32. In this embodiment, the operation of the graphical terminal 30 can proceed with less data transfer between the graphical terminal 30 and graphical server 32 during use. This embodiment is better suited to mobile devices, with lower connection speeds and more stringent power consumption requirements. For a mobile device, a non-volatile memory for storing the graphical information is preferred, since power may be lost frequently. This embodiment may also be used with other phones, in order to supply the most responsive interface.

The portion of the graphical information stored in the graphical terminal 30 is thus a design decision to be made by each network provider. Several variations may be available to accommodate different phone types.

The present invention provides significant advantages over the prior art. Operation of the user interface can be completely separated from the protocol(s) used to provide communication sessions. Hence, any desired functionality for the user interface can be determined by the network provider, without the need for extensions to the protocol itself. Furthermore, changes at one level do not necessarily require the translator to cope with these changes. For instance, extensions to a protocol could be made, but as long as the existing basics of the communication remains the same (i.e., the invite, accept, . . . and other native SIP messages), the translator can ignore the changes without affecting operation of the user interface. Using a translator allows the operation of the graphical server to remain consistent over multiple protocols and/or variations of protocols.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A communication system comprising:
   a digital network;
   one or more communication servers coupled to said network for enabling communications sessions responsive to commands conforming to one or more known protocols;
   a plurality of graphical terminals coupled to said network for communicating by sending and receiving packetized data and signaling messages over said network during said communications sessions; and
   one or more graphical servers each coupled to a plurality of said graphical terminals for:
      receiving service requests, where at least some of said service requests are generated responsive to a signaling message;
      sending graphical information to the graphical terminals responsive to said service requests to provide graphical interfaces on said graphical terminals;
      receiving control information associated with actions by users using said graphical interface; and
      generating service requests to create signaling messages responsive to said control information.

2. The communication system of claim 1 and further comprising at least one translator for translating a signaling message into a service request associated with one of said graphical terminals.

3. The communication system of claim 2 wherein each one or more of said graphical terminals include a translator.

4. The communication system of claim 2 wherein one or more translators are located on said digital network for receiving signaling messages from a plurality of graphical terminals.

5. The communication system of claim 4 wherein one or more of said graphical servers include a translator.

6. The communication system of claim 1 wherein said graphical terminals include a communications stack.

7. The communication system of claim 1 wherein said graphical terminals include a graphical client for receiving graphical information from an associated graphical server.

8. The communication system of claim 7 wherein said graphical terminals further comprise a display coupled to said graphical client.

9. A method of providing communications over a digital network, comprising the steps of:
- receiving signaling messages conforming to one or more known protocols from one or more communication servers coupled to said network;
- translating the signaling messages into service requests indicating an desired action;
- receiving the service requests in one or more graphical servers each coupled to a plurality of said graphical terminals;
- sending graphical information from the graphical servers to the graphical terminals responsive to the service requests to control graphical interfaces executed on the graphical terminals;
- sending control information associated with actions by users using said graphical interface to the one or more graphical servers; and
- generating service requests to create signaling messages responsive to said control information.

10. The method of claim 9 and further wherein the translating step comprises the step of translating signaling messages into service requests using translators in said graphical terminals.

11. The method of claim 9 wherein the translating step comprises the step of translating signaling messages into service requests using a translator on said digital network, said translator receiving signaling messages from a plurality of graphical terminals.

12. The method of claim 11 wherein the translating step comprises the step of translating signaling messages into service requests using a translator on a graphical server, said translator receiving signaling messages from a plurality of graphical terminals.

* * * * *